Sept. 3, 1940.  C. R. CRARY  2,213,205
TOY PARACHUTE
Filed April 18, 1939
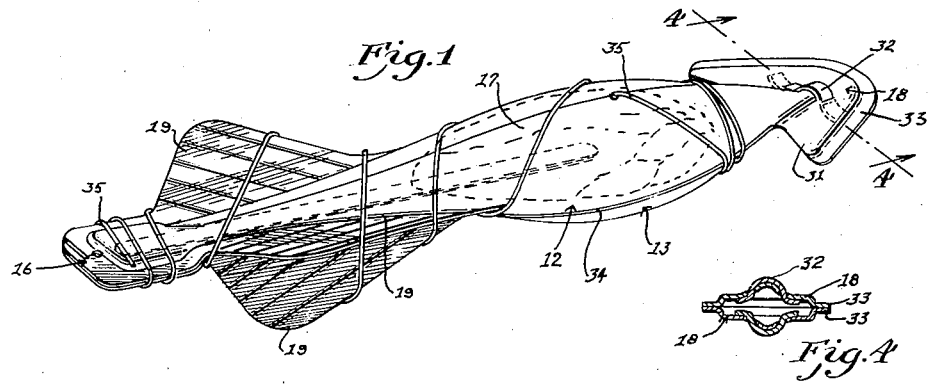
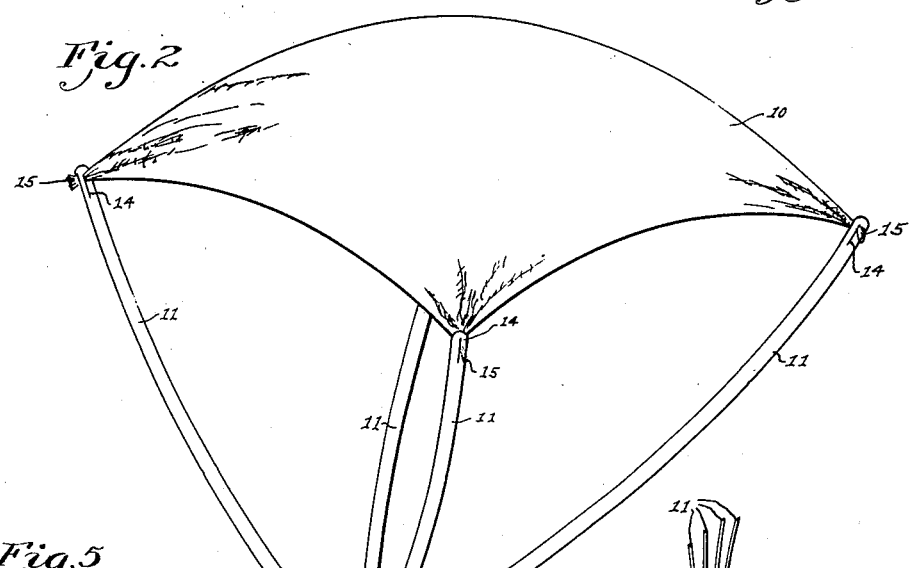
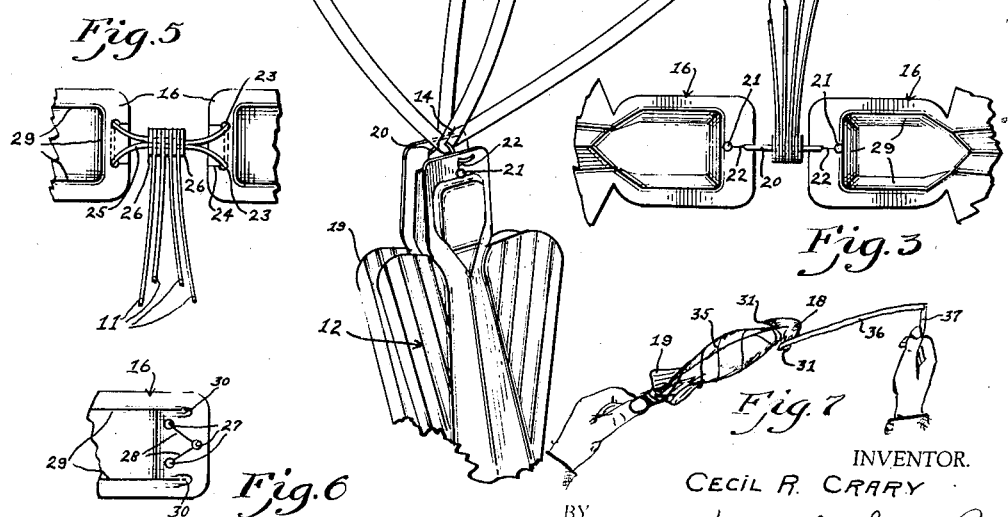
INVENTOR.
CECIL R. CRARY
BY Barnes, Kisselle, Laughlin & Raisch
ATTORNEYS.

Patented Sept. 3, 1940

2,213,205

UNITED STATES PATENT OFFICE 2,213,205

TOY PARACHUTE

Cecil R. Crary, Detroit, Mich., assignor to Grace T. Crary, Detroit, Mich.

Application April 18, 1938, Serial No. 202,627

5 Claims. (Cl. 46—86)

This invention relates to miniature parachutes.

An object of the invention is to provide a toy parachute which may be projected high in the air by a simple shooting arrangement before it opens for descent.

Another object is to provide a parachute which does not become tangled and which may be easily assembled from the parts provided. Another object is to provide a casing for a parachute which permits the parachute to be projected while folded, the casing subsequently opening to release the parachute and serve as a weight for the descent.

Additional features and objects of the present invention have to do with a timing means, materials used in the construction, and details of design and construction of the parts and means for connecting the parts. These detailed objects and features will be further brought out in the following description and claims.

Briefly, the general structure of the invention consists of a symmetrical casing member which is adapted to enclose a folded parachute and the cords or stays therefore so that the entire assembly may be projected into the air with the casing closed. A timing means is provided on the casing so that at a certain point in its flight the casing will spring open and release the parachute so that it may open for the descent. The casing then forms the necessary weight to maintain the parachute in proper position for flight.

In the drawing are shown modifications of my invention which are herein disclosed for purposes of exemplification:

Fig. 1 illustrates a perspective assembly of the casing in condition for flight.

Fig. 2 shows the parachute in its open position.

Fig. 3 is a detail view of the connection between the casing members and the stays leading to the parachute.

Fig. 4 is a section taken on the lines 4—4 of Fig. 1.

Fig. 5 is a modification of the connection between two casing members and the stay members.

Fig. 6 is a modification in the design of the tail of the casing member.

Fig. 7 illustrates the manner in which the assembly of Fig. 1 may be forceably projected into the air.

Referring to the drawing the invention consists generally of a parachute member 10, stays or connecting cords 11, and casing members 12 and 13.

The parachute member 10 preferably consists of a square sheet material formed of a fabric or other substance. A preferred material for this parachute member 10 is a thin piece of rubber latex which is formed by solids deposited from an aqueous dispersion of rubber. This rubber parachute not only provides a waterproof and extremely light parachute member, but it also has other functions in the combination which will be later referred to.

The attaching members or stays 11 may be formed of cord or string or other flexible members. A preferred form of stay is that illustrated in Fig. 2, where the stays are shown formed of a cellulose acetate or Celluloid. These stays are formed of narrow strips of the above material in sheet form and each end of the strip is provided with a slit 14. If a rubber or latex parachute is used, as above described, it is especially adapted for connection with these celluloid strips 11; it is necessary only to poke the corners of the rubber sheet through the slits 14. The corners may then be stretched slightly through the slit so that the tuft 15, when released, projects through the slit and holds each corner securely to the stay.

I provide this Celluloid stay to prevent twisting and tangling and it will be recognized that other materials will be suitable for this purpose. Any light material which is flexible but which presents a relative stiffness as compared with string or thread comes within the limits of my invention. The shape need not be as shown but may be adapted to the material used.

The casings 12 and 13 consist of identical members which are symmetrically formed so that when placed together they form a streamline body or enclosed casing. Each casing is provided with a tail portion 16, a body portion 17, and a nose portion 18. The body portion is hollow and tapers toward the tail. This restricted portion of the body is provided with wings 19 to guide the combined casing in its flight.

The Figs. 3, 5 and 6, each illustrate modifications of the design of the tail member 16. In Fig. 3 is shown a tail member which may be connected by a single strip or tension member 20. This member is preferably simply a strip of rubber. Each tail portion is provided with an entrance hole 21, below which is a slit 22. The ends of the rubber 20 may be inserted through the holes 21 and stretched down into the slits 22 and when they are released, they will be securely held between the edges of the slits 22. This connecting piece 20 is also used to attach the stays 11 to the casing members. This is done by inserting one end of the connecting member 20 through the lower slits 14 in the stays. In Fig.

5, the end of each tail member is provided with two holes 23 and with slits 24 from the rear edge of the tail to the hole. With this modification, a rubber band 25 may be used to connect the tails 18, as shown in the drawing. It is passed through the holes 23 through the slits 24. With the use of this rubber band it is desirable to use washers 26 at each side of, and between stays 11. These washers hold the rubber band sections together so that the stays may turn easily with respect to the casings. With the use of a single connecting strip 20, as shown in Fig. 3, the washers 26 are not a necessary element. In Fig. 6, a tail member is shown with three triangularly looping holes 27, the holes being connected by slits 28. This arrangement is also adapted for use with a rubber band, as in Fig. 5, the band being inserted through the hole at the apex of the triangle and being pulled into the two forward holes. Each of the tail members is provided with embossed portions 29 which will permit an easy gripping of the tail. In some cases, it is desirable to provide lugs 30 on the tail to prevent the fingers from touching the connecting bands while shooting. The center portion of the tail members enclosed by the embossed portions 29, is preferably raised slightly to provide room for the stays when the parachute is folded into the casing.

The nose 16 of the casing members is illustrated in Figs. 1 and 4. The nose is formed in the shape of an arrowhead and has a width greater than the forward part of the body, so that the transversely projecting portions 31 may be used as a lug for projecting the casing. In some cases I have found it desirable to provide the nose portion of the casing with a weight 32. The cross-section of Fig. 4 shows the manner in which this weight may be held in the nose. The edges 33 of the nose are preferably formed as a flat flange so that when the two casing members 12 and 13 are placed with their open faces in adjoining relationship, these flanges 33 will fit together to form a comparatively tight joint. The body 17 of the casing is also preferably provided with a side flange 34 for the same purpose.

The casing members for the parachute may be formed of any light sheet material which is adapted to be pressed into shapes similar to those shown in the drawing. A material which I have found particularly desirable is a light, comparatively stiff, fiber material which may be pressed into shape and which is waterproofed so that it retains its shape even though subjected to moisture.

Attached to the back of one of the casing members 12 is a timing cord 35, the function and operation of which will later be described. This cord may be formed of fibrous material or of a strip of rubber.

In Fig. 7 is illustrated a shooting stick comprising a rubber band 36 held at one point in the end of a gripping stick 37.

In the operation: The parachute 10 and stays 11 are folded in such a manner that they may be contained between the identical casings 12 and 13. This folding is done by drawing the stays together in a substantially parallel relationship and rolling the parachute sheet 10 to a compact bundle so that it may be folded upon the stays. The stays are then drawn up into the body of one of the casing members and the parachute bundle is pressed on top of the stays until the other casing member can be placed over the parachute to form a closed casing as shown in Fig. 1. The timing member 35 is then wound around the body portion substantially as shown in Figs. 1 and 7, the end is held at the tail between the thumb and forefinger, as shown in Fig. 7. The rubber band 36 of the shooting stick 37 is then looped over one of the lugs 31 on the arrowhead nose and the stick is held in the hand as shown in Fig. 1. In this manner, the assembly may be projected skyward after a tensioning of the band 36 and a release of the tail. As the assembly rises, the timing member 35 unwraps from the body of the casings and at a certain point in the flight, depending on the number of turns of the timing member, the casings 12 and 13 will no longer be held together by the timing member. At this point in the flight the resiliency of the rubber parachute within the body will spring it open and release the parachute and stays. The weighted portion 32 in the nose 16 will turn the two casing members downward. The parachute will then open and fill with air as shown in Fig. 2, and the casing portions 12 and 13 will serve as the balance weight during the descent. It will be seen that the rubber parachute is especially desirable in the device since it serves in the manner of a spring to open the casing members at the proper time. The stays 11 being made of Celluloid, will not become entangled as might be possible in the case of cords. Consequently, the opening of the parachute is assured on each flight.

While I have disclosed my invention as a toy parachute, it will be recognized that it may be readily adapted to naval, army, aviation or other uses for the purpose of carrying flares, signals, or other objects.

What I claim is:

1. In a toy, an aerial projectile, an elongated casing comprising a pair of relatively movable casing members having a body portion, means connecting the tail portions only of said casing members together, said means permitting hinging about a transverse axis at the tail thereof, timing means to hold said members together for an interval of time while the projectile is moving in the air, after which air pressure separates the casing members at the front thereof.

2. In a toy, an aerial projectile, an elongated hollow casing comprising a pair of relatively movable casing members having a body portion, means connecting the tail portions only of said casing members together, said means permitting hinging about a transverse axis of the tail thereof, a parachute arranged to be folded within the casing, and timing means to hold said members together for an interval of time while the projectile is moving in the air, after which air pressure separates the casing members at the front thereof and releases the folded parachute.

3. In a toy, an aerial projectile, an elongated hollow casing comprising a pair of relatively movable casing members having a body portion, means connecting the tail portions only of said casing members together, said means permitting hinging about a transverse axis of the tail thereof, a parachute arranged to be folded within the casing, stays for attaching said parachute to said casing, and timing means to hold said members together for an interval of time while the projectile is moving in the air, after which air pressure separates the casing members at the front thereof and releases the folded parachute.

4. In a toy, an aerial projectile, an elongated hollow casing comprising a pair of relatively movable casing members having a body portion, means connecting the tail portions only of said casing members together, said means permitting hinging about a transverse axis of the tail thereof, a parachute arranged to be folded within the casing, stays for connecting said parachute to said hinge means, and timing means to hold said members together for an interval of time while the projectile is moving in the air, after which air pressure separates the casing members at the front thereof and releases the folded parachute.

5. A toy comprising in combination, an elongated hollow casing comprising a plurality of relatively movable casing members having a body portion and a tail portion, means attaching the tail portions loosely together to permit hinging about a transverse axis, a parachute arranged to be folded within the body portion of the casing, and timing means to hold said members together as a casing for an interval of time while the projectile is moving in the air, after which said members shift relative to each other to release said parachute.

CECIL R. CRARY.